United States Patent
Stupar

(10) Patent No.: US 6,203,208 B1
(45) Date of Patent: Mar. 20, 2001

(54) FIBER OPTIC LIGHTING SYSTEM CONNECTOR COUPLING MEDIUM

(75) Inventor: Jeffrey M. Stupar, West Dundee, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 09/283,398

(22) Filed: Apr. 1, 1999

Related U.S. Application Data

(63) Continuation-in-part of application No. 09/186,688, filed on Nov. 5, 1998, now Pat. No. 6,139,194.

(51) Int. Cl.$^7$ ...................................................... G02B 6/38
(52) U.S. Cl. .............................. 385/73; 385/77; 385/74; 385/58; 362/581
(58) Field of Search ................................ 385/73, 77, 75, 385/58, 62, 53; 362/551, 581

(56) References Cited

U.S. PATENT DOCUMENTS

| | | |
|---|---|---|
| 3,996,189 | 12/1976 | Travnicek . |
| 4,190,316 | * 2/1980 | Malsby et al. ...................... 385/61 |
| 4,421,383 | * 12/1983 | Carlsen .................................. 385/79 |
| 4,682,849 | 7/1987 | Kowata et al. . |
| 4,704,660 | 11/1987 | Robbins . |
| 4,780,510 | 10/1988 | Uemiya . |
| 4,782,430 | 11/1988 | Robbins . |
| 4,957,347 | 9/1990 | Zarian . |
| 5,052,778 | 10/1991 | Jamshid . |
| 5,058,985 | 10/1991 | Davenport . |
| 5,067,831 | 11/1991 | Robbins et al. . |
| 5,080,460 | 1/1992 | Erdman et al. . |
| 5,095,517 | 3/1992 | Monguzzi et al. . |
| 5,122,580 | 6/1992 | Zarian et al. . |
| 5,149,467 | 9/1992 | Zarian . |
| 5,221,387 | 6/1993 | Robbins et al. . |
| 5,225,166 | 7/1993 | Zarian et al. . |
| 5,298,327 | 3/1994 | Zarian et al. . |
| 5,315,684 | 5/1994 | Szegda . |
| 5,337,390 | 8/1994 | Henson et al. . |
| 5,381,500 | 1/1995 | Edwards et al. . |
| 5,418,874 | 5/1995 | Carlisle et al. . |
| 5,425,120 | 6/1995 | Peterson et al. . |
| 5,452,186 | 9/1995 | Dassanayake . |
| 5,530,940 | 6/1996 | Ludwig, Jr. et al. . |
| 5,647,658 | 7/1997 | Ziadi . |
| 5,668,904 | 9/1997 | Sutherland et al. . |
| 5,701,375 | * 12/1997 | Duck et al. ............................ 385/31 |

OTHER PUBLICATIONS

L. K. Rangan et al., "Light Pipe Optical Joints Made From Silicone Disks", 1988, pp. 496–499.

Madhu Baile, "Optically Transparent Silicone Elastomers", 1985, pp. 97–105.

* cited by examiner

*Primary Examiner*—Darren Schuberg
*Assistant Examiner*—Fayez Assaf
(74) *Attorney, Agent, or Firm*—John P. O'Brien; Mark W. Croll; Donald J. Breh

(57) ABSTRACT

A fiber optic cable connector coupling medium disposable in an axial bore of a connector sleeve member for coupling a fiber optic cable end portion to a light transmitting conductor member. The coupling medium has a resilient generally disk shaped portion having first and second convex end portions engageable with a corresponding one of the fiber optic cable end portion and conductor member in the axial bore of a sleeve member. The coupling medium has good optical clarity, low hardness and tackiness to provide an improved light transmission coupling. The coupling medium is also relatively thin and has substantially the same refractive index as a fiber optic cable end portion and a conductor member between which the coupling medium is disposed.

20 Claims, 2 Drawing Sheets

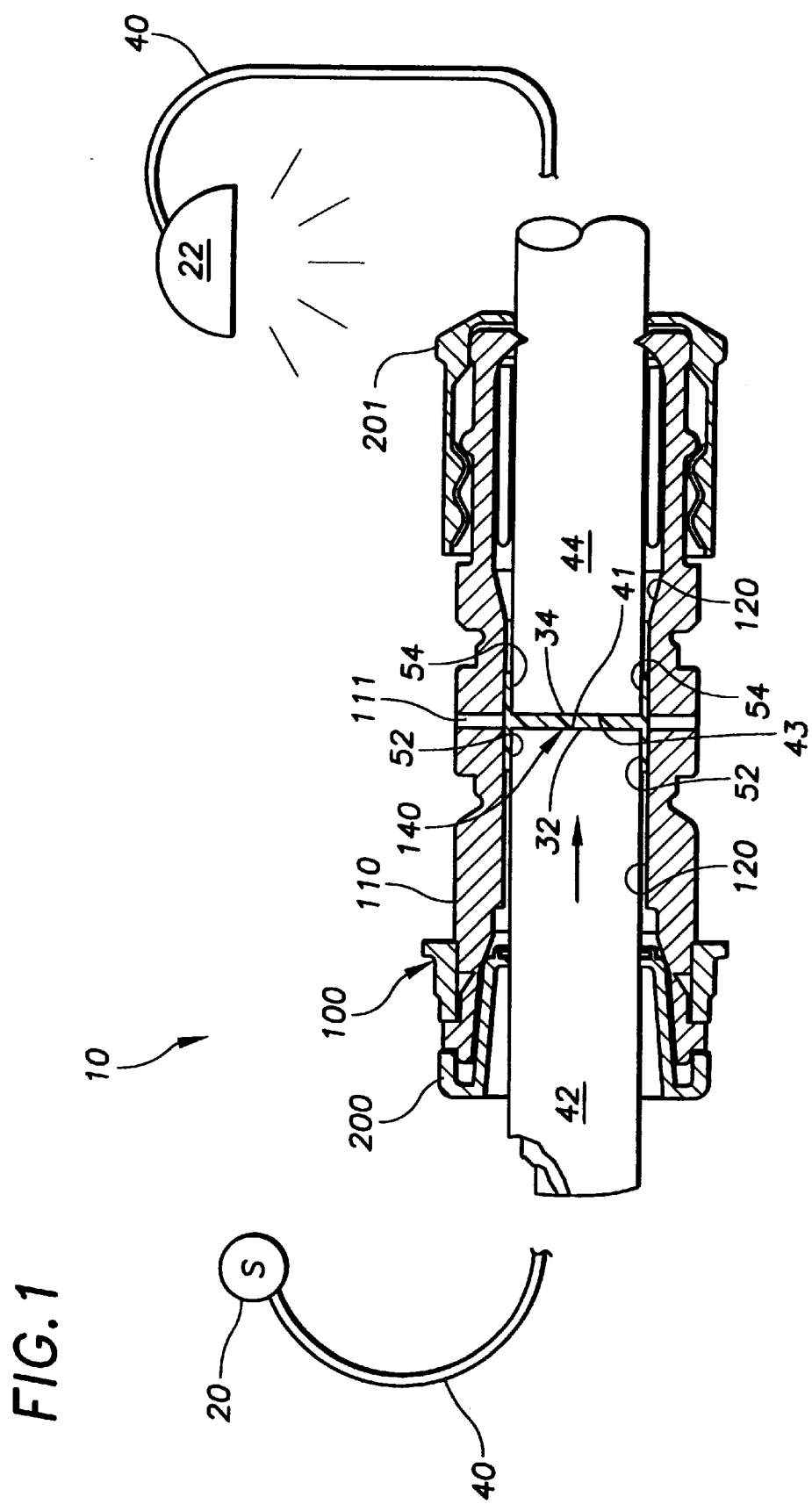

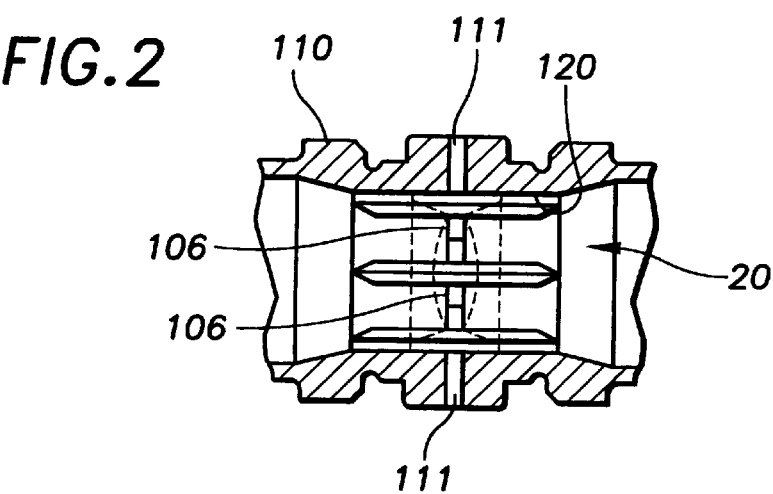
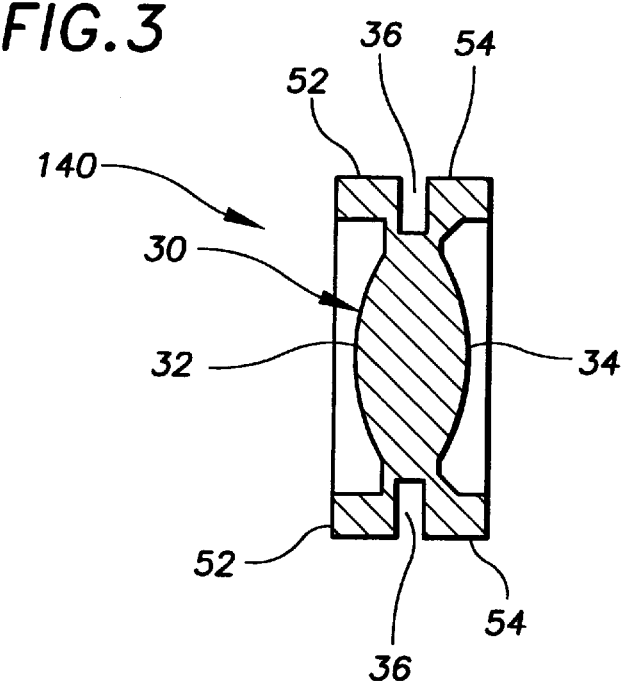
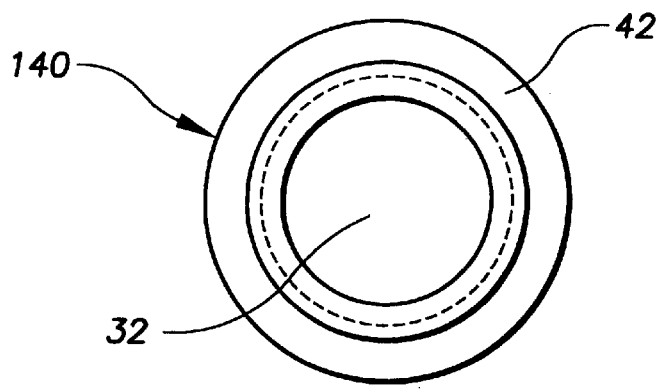

FIBER OPTIC LIGHTING SYSTEM CONNECTOR COUPLING MEDIUM

CROSS REFERENCE TO RELATED APPLICATIONS

The present application is a continuation-in-part of co-pending U.S. application Ser. No. 09/186,688 filed on Nov. 5, 1998, now U.S. Pat. No. 6,139,194, entitled "Fiber Optic Lighting System Connector", and is related to co-pending U.S. application Ser. No. 09/334,388 filed on Jun. 16, 1999 also entitled "Fiber Optic Lighting System Connector", both of which are assigned commonly herewith and incorporated herein by reference.

BACKGROUND OF THE INVENTION

The invention relates generally to fiber optic lighting system connectors, and more particularly to fiber optic lighting system connector coupling mediums, and combinations thereof.

Fiber optic lighting systems are known and include generally one or more fiber optic cables for transmitting visible light from a source to one or more environment illuminating fixtures. The light is typically emitted from a halogen, or metal halide, or other broad spectrum source, and is transmitted through one or more fiber optic cables having a light transmitting core covered by a reflective outer coaxial cladding, which is usually covered by a protective coaxial outer sheath, or jacket.

The potential application of fiber optic lighting systems remains largely unrealized in part for inefficiencies associated with the transmission of power between the light source and the light emitting fixture. Some power loss occurs as light propagates along the length of the fiber optic cable, and it is estimated that existing, commercially available, fiber optic cables lose approximately 2 percent of the transmitted power per linear foot of cable. Advances in materials science however are expected to substantially reduce these losses in the near future. Another source of power loss in fiber optic lighting systems, and that with which the present invention is concerned primarily, is associated with the mechanical coupling of fiber optic cables generally, and more particularly the connecting of fiber optic cables to light sources, to other fiber optic cables, and to light emitting fixtures.

The referenced co-pending U.S. application Ser. No. 09/186,688 entitled "Fiber Optic Lighting System Connector" and co-pending U.S. application Ser. No. 09/334,388 entitled "Fiber Optic Lighting System Connector" disclose novel fiber optic lighting system connectors for coupling fiber optic cable end portions to each other and more generally to light transmitting conductor members that improve the light transmission efficiency therebetween, and represent substantial advances in the art.

The present invention is drawn generally toward advancements in the art of fiber optic lighting system connectors, and more particularly to fiber optic lighting system connector coupling mediums, and combinations thereof.

An object of the invention is to provide novel fiber optic lighting system connectors, and coupling mediums therefor, that overcome problems in the prior art.

A more particular object of the invention is to provide novel fiber optic lighting system connector coupling mediums disposable between a fiber optic cable end portion and a conductor member to provide improved light transmission therebetween.

A further object of the invention is to provide novel fiber optic lighting system connector coupling mediums having at least one and preferably all of the following characteristics, including resilience, surface smoothness, optical clarity, low hardness, and tackiness to provide an improved light transmission coupling between a fiber optic cable end portion and a conductor member in a fiber optic lighting system connector.

Another object of the invention is to provide novel fiber optic lighting system connector coupling mediums having substantially the same refractive index as a fiber optic cable end portion and as a conductor member between which the coupling medium is disposed.

Another object of the invention is to provide novel fiber optic lighting system connector coupling mediums having a structure that reduces light loss by eliminating or at least substantially reducing any occlusions disposed at an interface between the coupling medium and a conductor member.

Another object of the invention is to provide novel fiber optic lighting system connector coupling mediums having reduced thickness in some proportion to a diameter of the fiber optic cable end portion and to the diameter of the conductor member coupled thereby to reduce light loss in the coupling medium.

Still another object of the invention is to provide novel fiber optic lighting system connector coupling mediums that are liquid injection moldable in a sleeve member of a fiber optic lighting system connector.

Yet another object of the invention is to provide novel fiber optic lighting system connector coupling mediums that prevent moisture or debris from infiltrating interfaces between the coupling medium and the fiber optic cable end portion and conductor member.

These and other objects, aspects, features and advantages of the present invention will become more fully apparent upon careful consideration of the following Detailed Description of the Invention and the accompanying Drawings, which may be disproportionate for ease of understanding, wherein like structure and steps are referenced generally by corresponding numerals and indicators.

BRIEF DESCRIPTION OF THE DRAWINGS

FIG. 1 is a partial sectional view of a coupling medium useable for coupling a fiber optic cable end portion and a conductor member in a fiber optic lighting system connector.

FIG. 2 is a partial sectional view of a sleeve member having an axial bore for accommodating a coupling medium according to the present invention.

FIG. 3 is a sectional view of a coupling medium.

FIG. 4 is an end view of a coupling medium.

DETAILED DESCRIPTION OF THE INVENTION

FIG. 1 is a schematic view of a fiber optic lighting system 10 comprising generally a light source 20 coupled to a light fixture 22 by a fiber optic cable 40. The light source 20 may be any source suitable for use in fiber optic lighting systems, for example a halogen or metal halide or broad spectrum light source. The light fixture 22 may also be any light emitting and/or light diffusing fixture. Alternatively, the light fixture 22 may be a portion of the fiber optic cable itself oriented or modified to emit light directly therefrom, for example from an end portion thereof, or from exposed portions of the fiber optic core along its length.

FIG. 1 illustrates a fiber optic cable connector 100 comprising generally a sleeve member 110 having an axial bore 120 for receiving a fiber optic cable end portion 42 in a first end portion thereof and a conductor member 44 in a second end portion thereof. A coupling medium 140 is disposed in the axial bore 110 of the sleeve member 120 between the fiber optic cable end portion 42 and the conductor member 44 to provide an improved light transmitting coupling therebetween, whereby the connector 100 maintains the fiber optic cable end portion 42 and the conductor member 44 in contact with corresponding portions of the coupling medium 140, as discussed below.

The light transmitting conductor member 44 may be another fiber optic cable end portion, or a conductor member end portion of a light source or of a light fixture. The fiber optic cable connector 100 is thus useable generally to couple a fiber optic cable to another fiber optic cable, or to a light source or light fixture.

In the present specification, including the claims thereof, references to a "light transmitting conductor member" or merely a "conductor member" encompass any one of a fiber optic cable end portion, and a conductor member end portion of a light source or of a light fixture, and more generally any light transmission member that is suitable for the transmission of light in fiber optic lighting systems, and that may be coupled by the connector 100 of the present invention.

In FIG. 3, the coupling medium 140 comprises a resilient generally disk shaped portion 30 having a first end portion 32 and an opposing second end portion 34. In FIG. 1, the first end portion 32 of the coupling medium is engaged with the fiber optic cable end portion 42 in the axial bore of the sleeve member, and second end portion 34 of the coupling medium 140 is engaged with the conductor member 44 in the axial bore of the sleeve member.

FIG. 3 also illustrates the first end portion 32 preferably having a first generally convex surface, and the opposing second end portion 34 preferably having a second generally convex surface. The generally disk shaped portion 30 having the first and second generally convex end portions 32 and 34 provides a robust structure that eliminates or at least substantially reduces the tendency for air gap formation to occur at the interfaces between the coupling medium 140 and the fiber optic cable end portion 42 and conductor member 44.

During assembly, as an end surface 41 of the fiber optic cable end portion 42 is increasingly advanced into the axial bore 110 of the sleeve member and increasingly contacts the resilient disk shaped portion 30, the convex end portion 32 thereof increasingly flattens and the surface contact area with the end surface 41 of the fiber optic cable end portion 42 increases generally from a central portion thereof radially outwardly until substantially the entire end surface 41 of the fiber optic cable end portion 42 is in contact with the end portion 32 of the resilient disk shaped portion 30.

The coupling medium 140 substantially reduces air gaps, or occlusions, that would occur in the absence thereof between the fiber optic cable end portion 42 and conductor member 44. The convex end portion 32 of the resilient generally disk shaped portion 30 reduces the tendency for air to become trapped between the disk shaped portion 30 and the fiber optic cable end portion 42 by moving air radially outwardly as the contact surface area therebetween increases during insertion of the fiber optic cable end portion 42 into the sleeve member 110. The other convex end portion 34 of the disk shaped portion 30 similarly eliminates or at least substantially reduces air gap formation between the convex end portion 34 thereof and the end surface 43 of the conductor member 44.

Losses in light transmission across the interfaces between the resilient generally disk shaped portion 30 and the fiber optic cable end portion 42 and the conductor member 44 are further reduced by matching the refractive index of the disk shaped portion 30 to the refractive indices of the fiber optic cable end portion 42 and the conductor member 44. Thus the disk shaped portion 30 of the coupling medium 140 preferably has a refractive index that is the same or at least substantially the same as a refractive index of the light transmitting cores of the fiber optic cable end portion 42 and the conductor member 44.

Light loss across the coupling medium 140 may also be reduced by minimizing a width of the disk shaped portion 30 between the first and second end portions 32 and 34 thereof when flattened by contact with the fiber optic cable end portion 42 and the conductor member 44. Reducing the width of the disk shaped portion 30 generally reduces the amount of light that escapes radially therefrom. It is thus desirable to minimize the width or thickness of the resilient generally disk shaped portion 30 to the extent possible while maintaining the structural integrity thereof. The disk shaped portion 30 of the coupling medium is sized preferably to have a thickness between the first and second end portions 32 and 34 thereof when in contact with the fiber optic cable end portion 42 and the conductor member 44 not greater than approximately 15% of the diameter of the fiber optic cable end portion 42 and the conductor member 44 between which the disk shaped portion 30 is disposed.

The disk shaped portion 30 of the coupling medium 140 is also preferably transparent to light, and more particularly to the portion of the light spectrum transmitted by the fiber optic cable end portion 42 and the conductor member 44, for example the visible portion of the light spectrum. Thus the optical clarity of the coupling medium is preferably as good as possible for the spectrum of light transmitted thereby, within the economic limits imposed by the particular application.

The first and second end portions 32 and 34 of the resilient generally disk shaped portion 30 are also preferably relatively smooth, thereby further eliminating any occlusions that may form between the coupling medium 140 and the fiber optic cable end portion 42 and the conductor member 44. In one embodiment, the coupling medium 140 and more particularly the disk shaped portion 30 thereof is formed in a molding operation wherein mold plate portions that form the first and second end portions 32 and 34 of the disk shaped portion 30 are polished to have an SPE No. 2 diamond finish.

The resilient generally disk shaped portion 30 is also formed preferably of a relatively soft material, at least in comparison to the fiber optic cable end portion 42 and the conductor member 44. In one embodiment, the resilient generally disk shaped portion 30 has a Shore A hardness rating between approximately 20 and not more than approximately 40, and preferably a Shore A hardness rating of approximately 20.

The softness of the resilient generally disk shaped portion 30 facilitates the ability thereof to flow and conform well to the surface contours and especially to smaller contours of the end surfaces 41 and 43 of the fiber optic cable end portion and conductor member when coupled therewith. The softer the resilient generally disk shaped portion 30, the more completely the coupling medium 140 will fill or saturate potentially air trapping voids that exist on the end surfaces 41 and 43 of the fiber optic cable end portion and conductor member. The softness of the disk shaped portion 30 also facilitates the expulsion of air from interfaces between the disk shaped portion 30 and the fiber optic cable end portion and conductor member as the end surfaces 41 and 43 thereof are moved axially into contact with corresponding convex end portions 32 and 34 of the disk shaped portion 30.

The disk shaped portion 30 is also preferably tacky to adhere to the end surfaces 41 and 43 of the fiber optic cable end portion 42 and conductor member 44. More particularly, the tacky end portions 32 and 34 of the disk shaped portion 30 adhere and conform with the voids and contours on the end surfaces 41 and 43 of the fiber optic cable end portion 42 and conductor member 44 during and after insertion thereof into the sleeve member and into engagement with the coupling medium 140 to eliminate, thereby eliminating or at least substantially reducing the formation of air pockets therebetween.

The resilient generally disk shaped portion 30 of the coupling medium 140 is preferably an optical grade silicone material. The coupling medium 140 is formed for example in a molding operation, and is preferably liquid injection molded in the axial bore 120 of the sleeve member 110 through one or more injection ports 111, which are illustrated in FIG. 2.

A commercially available silicone product suitable for liquid injection molding the coupling medium 140 in the sleeve member is a liquid injection molding and optical quality grade silicone, Part No. KE-1935A/B, available from Shincor Silicones, Inc., Akron, Ohio. The silicone available from Shincor Silicone, Inc. is a two component formula, including a hardener component, that is prepared by mixing. The Shincor silicone is preferably mixed or prepared with a reduced amount of hardener so that the silicone has a hardness of about 20 on the Shore A hardness scale. The silicone formula available from Shincor Silicone, Inc. is also preferably modified by the manufacturer to increase the tackiness of the silicone to meet a particular application requirement, which may be determined by those of ordinary skill in the art without undue experimentation in view of the disclosure herein.

A commercially available silicone product suitable for molding the coupling medium outside the sleeve member is an optical quality grade silicone, Part No. RTV615A/B, available from the General Electric Company, Lisle, Ill.

The molded coupling medium 140 may be assembled with the sleeve member 110 after molding by insertion of the coupling medium into the axial bore 120 of the sleeve member, for example by adhering the tacky disk shaped portion 30 thereof onto either end surface 41 or 43 of the fiber optic cable end portion 42 or conductor member 44. In another embodiment, the coupling member 140 is supported in the axial bore 120 of the sleeve member 110, for example by one or more abutment member members 106 extending therein as illustrated in FIG. 2. The coupling medium 140 may be inserted into the axial bore 120 of the sleeve member 110 after molding where it is retained by the abutment members. Alternatively, the coupling medium 140 may be liquid injection molded about the abutment members 106 in the axial bore 120 of the sleeve member 110.

FIG. 2 illustrates the coupling medium 140 having a recess 36 disposed thereabout for receiving the one or more abutment members 106 in embodiments where the coupling medium 140 is molded outside the sleeve member before assembly therewith. In other embodiments however the recess 36 is not required, for example where the coupling medium 140 comprises only a resilient generally disk shaped portion 30 that is adhered onto one of the fiber optic cable end portion 42 or conductor member 44 prior to insertion thereof into the axial bore 120 of the sleeve member 110. In embodiments where the coupling medium 140 is liquid injection molded in the sleeve member, recesses will be formed thereon where required to accommodate any abutment members of the sleeve member.

These and other aspect of the coupling medium and abutment members are disclosed more fully in the co-pending U.S. application Ser. No. 09/186,688 entitled "Fiber Optic Lighting System Connector" and the co-pending U.S. application Ser. No. 09/334,388 entitled "Fiber Optic Lighting System Connector", both of which are incorporated herein by reference.

In other embodiments, illustrated in FIG. 3, the coupling medium 140 comprises a first generally annular sealing member 52 disposed about the disk shaped portion 30 and extending from the first end portion 32 thereof, and a second generally annular sealing member 54 also disposed about the disk shaped portion 30 and extending from the second end portion 34 thereof. FIG. 1 illustrates the first and second sealing members 52 and 54 engageable with the axial bore 120 of the sleeve member 110 and an outer portion of a corresponding one of the fiber optic cable end portion 42 and the conductor member 44 to form seals therebetween. The sealing members 52 and 54 prevent moisture and debris from entering into the interface between the coupling medium 140 and the end surfaces 41 and 43 of the fiber optic cable end portion and the conductor member.

The sealing members 52 and 54 are preferably formed of the same material and unitarily with the resilient generally disk shaped portion 30, for example in a molding operation. The sealing members 52 and 54 however are preferably liquid injection molded with the resilient disk shaped portion 30 in the axial bore 120 of the sleeve member 110.

In the exemplary connector 100, a cap is coupled generally to and engageable with the sleeve member to retain one of the fiber optic cable end portion and conductor member in engagement with the coupling medium 140. FIG. 1 illustrates a first cap 200 coupled to and engageable with a first portion of the sleeve member 110 to retain the fiber optic cable end portion 42 in engagement with the coupling medium 140, and a second cap 200 coupled to and engageable with a second portion of the sleeve member 110 to retain the conductor member 44 in engagement with the coupling medium 140.

The cap preferably facilitates biasing the corresponding fiber optic cable end portion 42 or conductor member 44 toward and into contact with the coupling medium 140 in the axial bore of the sleeve member 110 during assembly of the cap on the sleeve member 110. The resilient generally disk shaped portion 30 of the coupling medium 140 is preferably under compression to flatten the opposing convex end portions 32 and 34 thereof, as illustrated in FIG. 1 and discussed above, thereby maintaining firm contact with the fiber optic cable end portion 42 and conductor member 44, which are retained in the sleeve member by the corresponding caps.

In other embodiments, one or the other of the fiber optic cable end portion 42 or coupling medium 44 is fixed axially and preferably rotationally in the axially bore 120 of the sleeve member and maintained in firm contact with the coupling medium 140 by other means. These and other aspects of the connector 100 including the coupling of the caps to the sleeve member are disclosed more fully in the co-pending U.S. application Ser. No. 09/186,688 entitled "Fiber Optic Lighting System Connector" and the co-pending U.S. application Ser. No. 09/334,388 filed on Jun. 16, 1999 entitled "Fiber Optic Lighting System Connector", both of which are incorporated herein by reference.

While the foregoing written description of the invention enables one of ordinary skill to make and use what is considered presently to be the best mode thereof, those of ordinary skill will appreciate and acknowledge the existence of variations, combinations, and equivalents of the specific exemplary embodiments herein. The invention is therefore to be limited not by the exemplary embodiments, but by all embodiments within the scope and spirit of the appended claims.

What is claimed is:

1. A fiber optic cable connector coupling medium disposable in an axial bore of a connector sleeve member for coupling a fiber optic cable end portion to a light transmitting conductor member, comprising:

a resilient generally disk shaped portion having a first end portion and an opposing second end portion, the first end portion of the coupling medium having a generally convex surface and the opposing second end portion of the coupling medium having a generally convex surface, the first and second end portions of the coupling medium each engageable with a corresponding one of a fiber optic cable end portion and a conductor member in an axial bore of a sleeve member to provide light transmitting coupling therebetween.

2. The coupling medium of claim 1, the generally disk shaped portion is transparent to a spectrum portion of light transmittable therethrough.

3. The coupling medium of claim 1, the generally disk shaped portion is an optical grade silicone material.

4. The coupling medium of claim 1, the generally disk shaped portion has a Shore A hardness rating between approximately 20 and approximately 40.

5. The coupling medium of claim 1, the generally disk shaped portion is tacky.

6. The coupling medium of claim 1, the generally disk shaped portion is sized to have a thickness between the first and second end portions thereof not greater than approximately 15% of a diameter of a fiber optic cable end portion and conductor member when disposed therebetween.

7. The coupling medium of claim 1 further comprising a first generally annular sealing member disposed about the generally disk shaped portion and extending from the first end portion thereof, a second generally annular sealing member disposed about the generally disk shaped portion and extending from the second end portion thereof, the first and second sealing members are engageable with the axial bore of a sleeve member and a corresponding one of a fiber optic cable end portion and conductor member to form seals therebetween.

8. A fiber optic cable connector coupling medium disposable in an axial bore of a connector sleeve member for coupling a fiber optic cable end portion to a light transmitting conductor member, comprising:

a resilient generally disk shaped portion having a first end portion and an opposing second end portion;

a first generally annular sealing member disposed about the generally disk shaped portion and extending from the first end portion thereof, a second generally annular sealing member disposed about the generally disk shaped portion and extending from the second end portion thereof, the first and second sealing members are engageable with the axial bore of a sleeve member and a corresponding one of a fiber optic cable end portion and conductor member to form seals therebetween.

9. The coupling medium of claim 8 is a unitary member formed of an optical grade silicone material.

10. The coupling medium of claim 8, the generally disk shaped portion is transparent to a spectrum portion of light transmittable therethrough.

11. The coupling medium of claim 8, the generally disk shaped portion has a Shore A hardness rating between approximately 20 and approximately 40.

12. The coupling medium of claim 8, the generally disk shaped portion is tacky.

13. A fiber optic cable connector useable for coupling a fiber optic cable end portion to a light transmitting conductor member in a fiber optic lighting system, comprising:

a sleeve member having an axial bore for receiving a fiber optic cable end portion and a conductor member;

a coupling medium disposed in the axial bore of the sleeve member, the coupling medium having a resilient generally disk shaped portion with a first end portion and an opposing second end portion, the first end portion of the coupling medium having a generally convex surface engageable with a fiber optic cable end portion in the axial bore of the sleeve member, the opposing second end portion of the coupling medium having a generally convex surface engageable with a conductor member in the axial bore of the sleeve member, a cap coupled to the sleeve member, the cap engageable with the sleeve member to retain one of the fiber optic cable end portion and conductor member in engagement with the coupling medium, whereby the coupling medium substantially reduces occlusions between the fiber optic cable end portion and conductor member in the axial bore of a sleeve member.

14. The connector of claim 13, the generally disk shaped portion having a refractive index substantially the same as a refractive index of the fiber optic cable end portion and the conductor member.

15. The connector of claim 13, the sleeve member includes an abutment member disposed in the axial bore thereof, the coupling medium is an optical grade silicone material supportable in the axial bore of the sleeve member by the abutment member.

16. The connector of claim 13, the generally disk shaped portion is transparent to a light spectrum portion transmittable therethrough.

17. The connector of claim 13, the generally disk shaped portion has a Shore A hardness rating between approximately 20 and approximately 40.

18. The connector of claim 13, the generally disk shaped portion is tacky.

19. The connector of claim 13, the coupling medium further comprising a first generally annular sealing member disposed about the generally disk shaped portion and extending from the first end portion thereof, a second generally annular sealing member disposed about the generally disk shaped portion and extending from the second end portion thereof, the first and second sealing members are engageable with the axial bore of the sleeve member and a corresponding one of the fiber optic cable end portion and the conductor member to form seals therebetween.

20. The connector of claim 13, the generally disk shaped portion is sized to have a thickness between the first and second end portions thereof not greater than approximately 15% of a diameter of the fiber optic cable end portion and conductor member when disposed therebetween.

* * * * *